United States Patent [19]
Weddendorf

[11] Patent Number: 5,634,754
[45] Date of Patent: Jun. 3, 1997

[54] QUICK-CONNECT BOLT

[75] Inventor: Bruce Weddendorf, Decatur, Ala.

[73] Assignee: The United States of America as represented by the Administrator of the National Aeronautics and Space Administration, Washington, D.C.

[21] Appl. No.: 604,145

[22] Filed: Feb. 20, 1996

Related U.S. Application Data

[63] Continuation-in-part of Ser. No. 187,032, Jan. 27, 1994, abandoned.

[51] Int. Cl.⁶ .................................................. F16B 19/00
[52] U.S. Cl. .............................. 411/354; 411/383; 411/418
[58] Field of Search .................................. 411/354, 383, 411/384, 385, 418, 51, 50, 65, 64, 72, 913, 271, 325

[56] References Cited

U.S. PATENT DOCUMENTS

| | | | |
|---|---|---|---|
| 533,977 | 8/1895 | Sugawara | 411/325 |
| 3,159,075 | 12/1964 | Bjork. | |
| 4,611,485 | 9/1986 | Leslie. | |
| 4,613,264 | 9/1986 | McIntyre. | |
| 5,090,857 | 2/1992 | Dunn | 411/354 |

*Primary Examiner*—Flemming Saether
*Attorney, Agent, or Firm*—Jerry L. Seemann

[57] ABSTRACT

A quick-connect bolt that can be inserted into a threaded receptacle without rotation and tightened with a minimum number of rotations.

5 Claims, 2 Drawing Sheets

QUICK-CONNECT BOLT

ORIGIN OF THE INVENTION

This is a continuation-in-part of application Ser. No. 08/187,032, filed Jan. 27, 1994 now abandoned.

The invention described in this patent was made by an employee of the United States Government and may be manufactured or used by or for the Government for governmental purposes without the payment of any royalties.

BACKGROUND OF THE INVENTION

1. Field of the Invention

This invention relates to the field of fasteners. Specifically, the invention pertains to a bolt-like fastener that can be tightened with very little rotation.

2. Background Information

A prior art device that has similar objectives to this invention is U.S. Pat. No. 3,159,075 entitled *Collapsible Bolt Having Spring Actuated Expanding Plunger*. This prior art device uses an axial plunger to collapse bolt-like threads. Once the threads are collapsed, the device may be inserted into a female-threaded receptacle (e.g., a nut) without any rotation. Once inserted, the action on the plunger is reversed to engage the threads for tightening and the plunger is secured with a cotter pin. The present device is intended to have at least two distinct advantages over the prior art device. First, the present invention eliminates the need for both an axial plunger and a cotter pin and, consequently, the awkwardness associated with the use of the plunger and cotter pin. Second, the present invention can carry much higher shear loads than the prior art device at any given size because the present invention has a solid rather than hollow shear-carrying section.

SUMMARY OF THE INVENTION

The present invention has the ability to replace standard bolt-like fasteners in connections where it is difficult to initiate threaded contact without cross threading (i.e., stripping) the threads or where conditions do not allow for numerous rotations necessary to tighten standard bolt-like fasteners.

An object of this invention is to provide a bolt-like fastener that can be installed with a minimum risk of cross threading.

Another object of this invention is to provide a bolt-like fastener that can be installed with a minimum number of rotations.

Still another object of this invention is to provide a bolt-like fastener that can be quickly and easily installed without a sacrifice in shear strength for any given bolt size.

BRIEF DESCRIPTION OF THE DRAWINGS

Details of the present invention can be best understood with reference to the following drawings in which.

DESCRIPTION OF THE PREFERRED EMBODIMENT

A preferred embodiment of the present invention comprises a driving element, a shank, a threaded sleeve, a means for expanding and contracting the threaded sleeve, a means for transferring torque from the shank to the threaded sleeve, and a means for biasing the threaded sleeve toward an expanded position.

Figure 1:
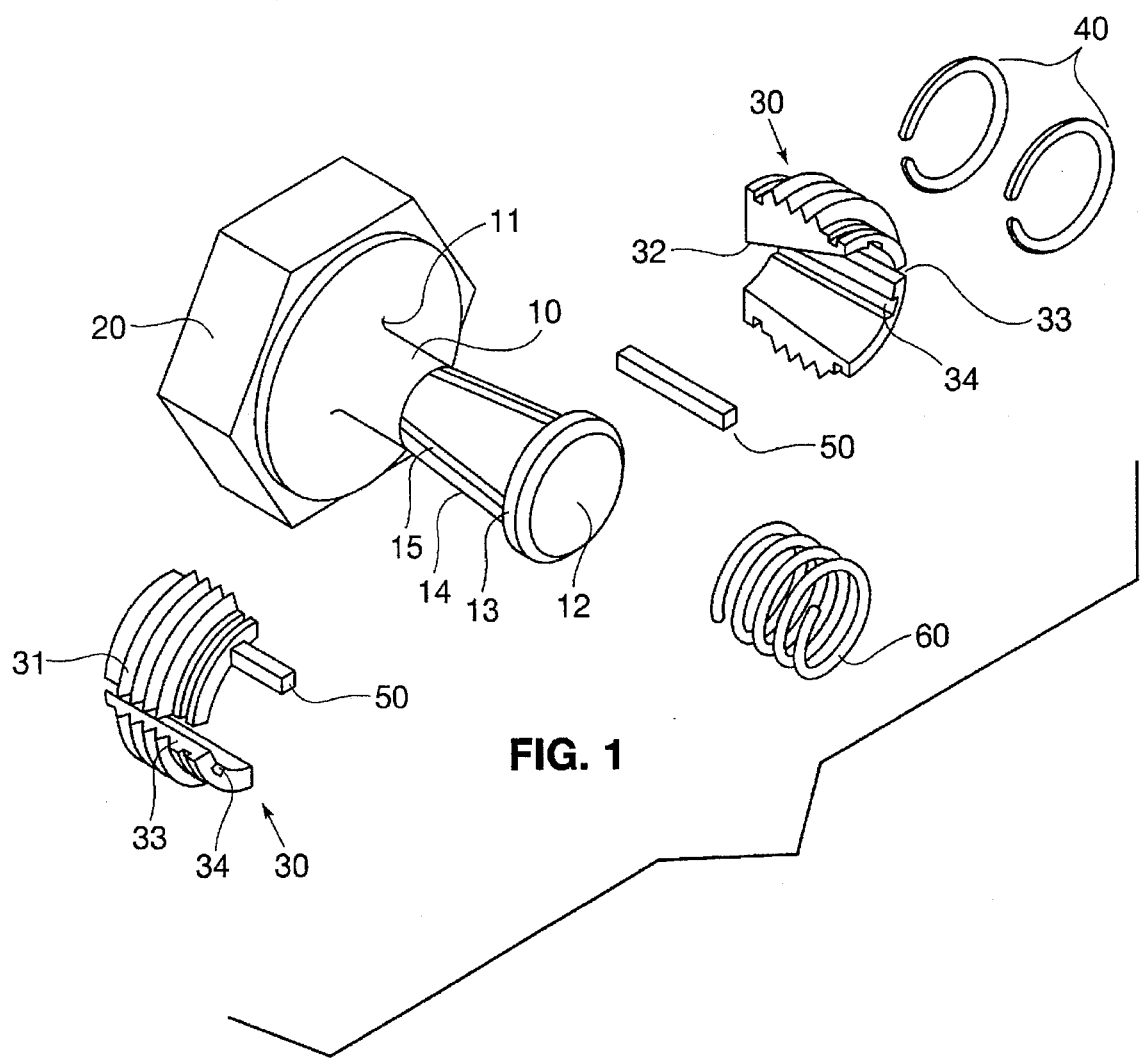
FIG. 1 is an exploded view of the present invention.

Referring to FIG. 1, a preferred embodiment of this invention comprises a shank (10), a driving element (20), a threaded sleeve (30), radial springs (40), keys (50), and a coil spring (60). The shank (10) has a head end (11), a tail end (12), and a flange (13). The driving element is rigidly connected to the head end (11) of the shank (10). The driving element (20) is shown as a standard hex head like that contained on most bolts. However, any other driving element (e.g., a square head, a slotted head, a Phillips® head, etc.) could be used. The shank (10) has a taper (14) on which the threaded sleeve (30) is slidably mounted. The threaded sleeve (30) has external (i.e., male) threads (31) and a tapered internal surface (32), which corresponds to the taper (14) on the tail end (12) of the shank (10). In the preferred embodiment, the threaded sleeve (30) has a plurality of axial slits (33) that divide the threaded sleeve (30) into a respectively equal number of segments. FIG. 1 shows essentially four axial slits and four segments. While the threaded sleeve (30) is slidably mounted on the shank (10), the threaded sleeve (30) must be rotationally locked to the shank (10) in order to transfer torque between the shank (10) and the threaded sleeve (30). This is accomplished by providing a groove (15) in the taper (14) on the tail end (12) of the shank (10) and a groove (34) in the tapered internal surface (32) of the threaded sleeve (30) and by inserting the keys (50) in the grooves (15, 34). In the preferred embodiment, each segment of the threaded sleeve (30) is keyed to the shank (10). The radial springs (40) serve two purposes. First, the radial springs (40) allow the individual segments of the threaded sleeve (30) to function as a unit. Second, the radial springs (40) cause the threaded sleeve (30) to contract as the threaded sleeve (30) slides down the taper (14) on the tail end (12 of the shank (10). The final element of the preferred embodiment is the coil spring (60). The coil spring (60) is mounted around the shank (10) between the head end (11) and the threaded sleeve (30) and serves to bias the threaded sleeve (30) axially away from the head end (11) of the shank (10). The flange (13) on the shank (10) confines the threaded sleeve (30) to the shank (10).

Figure 2:
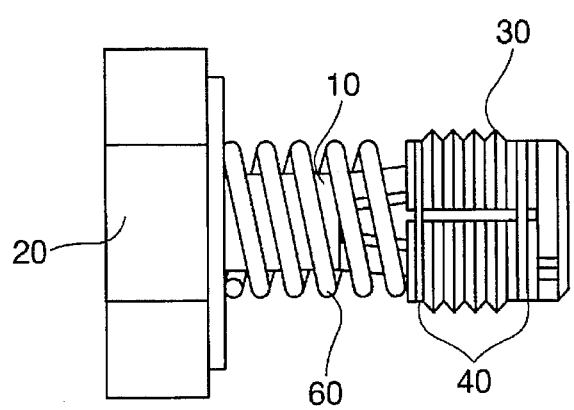
FIG. 2 is a side view showing the threads of the present invention in a contracted position.
Figure 3:
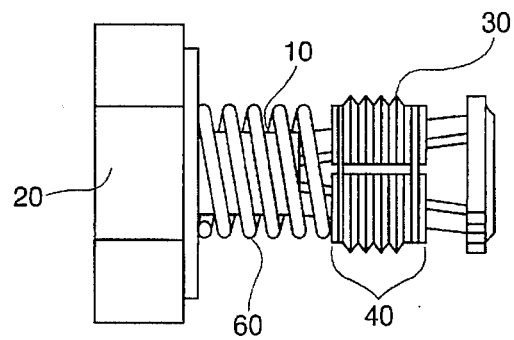
FIG. 3 is a side view showing the threads of the present invention in an expanded position.

FIG. 2 shows the quick-connect bolt fully assembled. To install the quick-connect bolt, the bolt is simply pushed into a female-threaded receptacle without rotation until the driving element prevents additional insertion. As the threaded sleeve of the quick-connect bolt is pushed against the female threads of the receptacle, the threaded sleeve slides along the taper toward the head end of the shank. As the threaded sleeve slides, the coil spring is compressed and the radial spring contracts the threaded sleeve. FIG. 3 shows the quick-connect bolt with a contracted threaded sleeve. The contracted threaded sleeve allows the quickconnect bolt to be inserted into the receptacle without rotation. Once the bolt has been pushed completely into the receptacle, the coil spring pushes the threaded sleeve back along the taper causing the threaded sleeve to expand into the threads of the receptacle. Now, the quick-connect bolt can be tightened in the usual manner with very little rotation.

Figure 4:
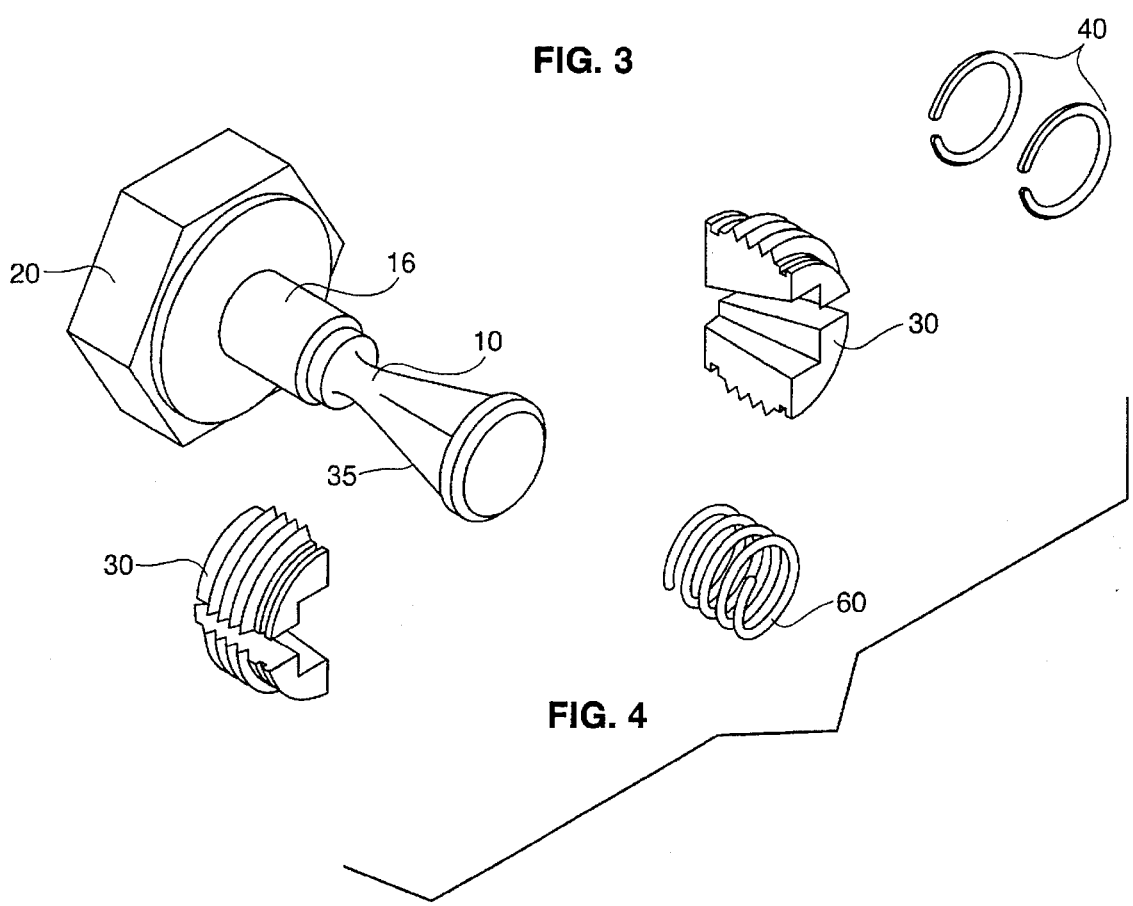
FIG. 4 is an exploded view showing some features which may be used in alternative embodiments.

FIG. 4 shows some additional features that may be used for alternative embodiments of the present invention. First, the shank (10) can be provided with an enlarged diameter section (16) adjacent to the driving element (20) to carry heavy shear loads if necessary. In such an alternative embodiment, the coil spring (60) would rest on the enlarged diameter section (16) rather than the driving element (20).

Second, while the preferred embodiment uses a frustoconical taper at the tail end (12) of the shank (10) and on the tapered internal surface (32) of the threaded sleeve (30), another alternative embodiment could use a taper in the form of a pyramidal frustum (35). Such a pyramidal taper on both the shank (10) and the threaded sleeve (30) would eliminate the necessity of the keys (50) to transfer torque between the shank (10) and the threaded sleeve (30).

What is claimed is:

1. A quick-connect bolt, comprising
   a. a shank having a head end and a tapered tail end;
   b. a driving element rigidly connected to said head end of said shank;
   c. a threaded sleeve slidably mounted on said tail end of said shank, said threaded sleeve having external threads and also having a tapered internal surface, said threaded sleeve also having an axial slit for allowing radial expansion of said threaded sleeve; said tapered tail end and said tapered internal surface of the sleeve having the shape of a pyramidal frustum and being in contact with each other such that movement of the sleeve toward said tail end expands said sleeve, said tapered surfaces cooperating to transfer torque between said shank and said sleeve;
   d. means for contracting said threaded sleeve as said sleeve moves toward the head end of the shank; and
   e. means for biasing said threaded sleeve axially away from the head end of the shank.

2. A quick-connect bolt, comprising
   a. a shank having a head end and a tail end, said shank also having an enlarged diameter section at said head end and a tapered section on said tail end of said shank;
   b. a driving element rigidly secured to said head end of said shank;
   c. a threaded sleeve slidably mounted on said tail end of said shank, said threaded sleeve having external threads and having an internal surface which is tapered to correspond to said tapered section on the tail end of the shank said threaded sleeve also having a plurality of axial slits for allowing radial expansion of said threaded sleeve; said tapered section on the tail end of said shank and said tapered internal surface each having the shape of a pyramidal frustum;
   d. a spring extending around the periphery of said threaded sleeve to contract said sleeve; and
   e. a compression spring mounted on said shank between said enlarged diameter section of said shank and said threaded sleeve for urging said sleeve toward the tail end of the shank.

3. A quick-connect bolt, comprising:

a shank having a head end and a tail end, said shank also having an enlarged diameter section at said head end and a tapered section on said tail end of said shank, said tapered section having four equally spaced grooves;

a driving element rigidly connected to said head end of said shank;

a threaded sleeve slidably mounted to said tail end of said shank, said threaded sleeve having external threads and having an internal surface that is tapered to correspond to said tapered section on said tail end of said shank, said threaded sleeve also having four axial slits for allowing radial expansion of said threaded sleeve, said internal surface also having grooves to match said grooves in tail end of said shank;

a radial spring attached around the circumference of said threaded sleeve;

keys secured between said matching grooves in said tail end of said shank and in said internal surface of said threaded sleeve; and a coil spring mounted around said shank between said enlarged diameter section of said shank and said threaded sleeve.

4. A quick-connect bolt as recited in claim 3, wherein both said tapered section on said tail end of said shank and said tapered internal surface of said threaded sleeve have a frustoconical shape.

5. A quick-connect bolt as recited in claim 3, further comprising a flange on said tail end of said shank.

* * * * *